(12) United States Patent
Kwon et al.

(10) Patent No.: US 9,496,533 B2
(45) Date of Patent: *Nov. 15, 2016

(54) CABLE-TYPE SECONDARY BATTERY AND METHOD OF PREPARING THE SAME

(71) Applicant: LG Chem, Ltd., Seoul (KR)

(72) Inventors: Yo Han Kwon, Daejeon (KR); Je Young Kim, Daejeon (KR);
(Continued)

(73) Assignee: LG Chem, Ltd. (KR)

( * ) Notice: Subject to any disclaimer, the term of this patent is extended or adjusted under 35 U.S.C. 154(b) by 82 days.

This patent is subject to a terminal disclaimer.

(21) Appl. No.: 14/199,255

(22) Filed: Mar. 6, 2014

(65) Prior Publication Data

US 2014/0186673 A1    Jul. 3, 2014

Related U.S. Application Data

(63) Continuation of application No. PCT/KR2013/011965, filed on Dec. 20, 2013.

(30) Foreign Application Priority Data

Dec. 21, 2012  (KR) .......................... 10-2012-0151107

(51) Int. Cl.
*H01M 2/02* (2006.01)
*H01M 4/78* (2006.01)
(Continued)

(52) U.S. Cl.
CPC ........... *H01M 2/1653* (2013.01); *H01M 2/166* (2013.01); *H01M 4/13* (2013.01);
(Continued)

(58) Field of Classification Search
CPC ................... H01M 10/0422; H01M 10/0565; H01M 2/1653; H01M 4/75; H01M
(Continued)

(56) References Cited

U.S. PATENT DOCUMENTS 5,989,300 A     11/1999  Eshraghi
2002/0136958 A1*  9/2002  Park et al. .................... 429/303
(Continued)

FOREIGN PATENT DOCUMENTS

CN      103875113 A     6/2014
JP      H11-135100 A    5/1999
(Continued)

OTHER PUBLICATIONS

Search Report from European Application No. 13834366.0, dated Mar. 8, 2016.

*Primary Examiner* — Cynthia K Walls
(74) *Attorney, Agent, or Firm* — Lerner, David, Littenberg, Krumholz & Mentlik, LLP

(57) ABSTRACT

Provided is a cable-type secondary battery having a predetermined-shaped horizontal cross section and extending in a longitudinal direction, which includes a hollow core portion having a gel polymer electrolyte injected thereinto, an inner electrode which includes an inner current collector surrounding an outer surface of the hollow core portion and an inner electrode active material layer formed on a surface of the inner current collector, a separation layer surrounding an outer surface of the inner electrode, an outer electrode which includes an outer electrode active material layer surrounding an outer surface of the separation layer and an outer current collector surrounding an outer surface of the outer electrode active material layer, and a protective coating layer.

22 Claims, 3 Drawing Sheets

(72) Inventors: Hye Ran Jung, Daejeon (KR); Sang Young Lee, Daejeon (KR); Keun Ho Choi, Daejeon (KR); Eun Hye Kil, Daejeon (KR)

(51) Int. Cl.

| | | |
|---|---|---|
| *H01M 2/16* | (2006.01) | |
| *H01M 4/13* | (2010.01) | |
| *H01M 4/66* | (2006.01) | |
| *H01M 4/70* | (2006.01) | |
| *H01M 10/04* | (2006.01) | |
| *H01M 10/052* | (2010.01) | |
| *H01M 10/0568* | (2010.01) | |
| *H01M 10/0569* | (2010.01) | |
| *H01M 10/058* | (2010.01) | |

(52) U.S. Cl.
CPC ............... *H01M 4/66* (2013.01); *H01M 4/70* (2013.01); *H01M 10/0436* (2013.01); *H01M 10/052* (2013.01); *H01M 10/058* (2013.01); *H01M 10/0568* (2013.01); *H01M 10/0569* (2013.01); *H01M 2300/0085* (2013.01); *Y02E 60/122* (2013.01); *Y02P 70/54* (2015.11); *Y10T 29/4911* (2015.01)

(58) Field of Classification Search
CPC ............... 10/04;H01M 10/052; H01M 10/058; H01M 6/44; H01M 4/70; H01M 2220/20; H01M 2004/025; H01M 4/66; Y02E 60/122; Y02T 10/7011
See application file for complete search history.

(56) References Cited

U.S. PATENT DOCUMENTS

| | | | |
|---|---|---|---|
| 2005/0271796 A1* | 12/2005 | Neudecker et al. | ............ 427/58 |
| 2007/0054183 A1* | 3/2007 | Kim et al. | .................... 429/144 |
| 2007/0243456 A1 | 10/2007 | Ahn et al. | |
| 2011/0256456 A1 | 10/2011 | Jeon et al. | |
| 2012/0015233 A1 | 1/2012 | Kwon et al. | |
| 2012/0015239 A1 | 1/2012 | Kwon et al. | |
| 2012/0100412 A1 | 4/2012 | Kwon et al. | |
| 2012/0100415 A1 | 4/2012 | Kwon et al. | |
| 2012/0115040 A1 | 5/2012 | Kwon et al. | |
| 2012/0148902 A1 | 6/2012 | Kwon et al. | |
| 2012/0156554 A1 | 6/2012 | Kwon et al. | |
| 2012/0225352 A1* | 9/2012 | Abouimrane et al. | ......... 429/211 |
| 2012/0295144 A1 | 11/2012 | Kwon et al. | |
| 2014/0186672 A1 | 7/2014 | Kwon et al. | |

FOREIGN PATENT DOCUMENTS

| | | |
|---|---|---|
| JP | 2002-222666 A | 8/2002 |
| JP | 2010-514134 A | 4/2010 |
| JP | 2011-126975 A | 6/2011 |
| JP | 2012-089502 A | 5/2012 |
| KR | 2005-0099903 A | 10/2005 |
| KR | 2011-0089584 A | 8/2011 |
| KR | 2011-0089819 A | 8/2011 |
| KR | 2011-0127972 A | 11/2011 |
| KR | 2012-0000744 A | 1/2012 |

\* cited by examiner

CABLE-TYPE SECONDARY BATTERY AND METHOD OF PREPARING THE SAME

CROSS-REFERENCE TO RELATED APPLICATIONS

This application is a continuation of International Application No. PCT/KR2013/011965, filed on Dec. 20, 2013, which claims priority under 35 USC §119(a) to Korean Patent Application No. 10-2012-0151107, filed in the Republic of Korea on Dec. 21, 2012, the disclosures of which are herein incorporated by reference.

TECHNICAL FIELD

The present invention relates to a cable-type secondary battery and a method of preparing the same, and more particularly, to a freely deformable cable-type secondary battery including a hollow core portion into which a gel polymer electrolyte is injected, and a method of preparing the cable-type secondary battery.

BACKGROUND ART

Secondary batteries typically known among electrochemical devices are devices which store external electric energy by converting it into the form of chemical energy and then generate electricity when needed. The secondary battery is referred to as a "rechargeable battery", meaning that it can be recharged many times, and provides both economic advantage and environmental advantage in comparison to a primary battery which is discarded once used. A lead-acid battery, a nickel-cadmium (NiCd) battery, a nickel metal hydride (NiMH) battery, a lithium (Li)-ion battery, and a Li-ion polymer battery are known as the secondary battery.

Weight reductions in portable devices, such as notebooks and mobile phones, or automotive parts have been required as wireless communication technology has gradually developed. As a result, demand for secondary batteries that are used as energy sources of these devices has been increased.

Secondary batteries are prepared by putting an electrode assembly composed of an anode, a cathode, and a separator into a cylindrical or prismatic metal can or a pouch-type case formed of an aluminum laminate sheet, and then injecting an electrolyte thereinto. Since secondary batteries are mostly formed in a cylindrical-type, prismatic-type, or pouch-type structure, a predetermined space for installing these secondary batteries is essentially required. Thus, the development of portable devices may be restricted.

Recently, an easily deformable new type of secondary battery has been required, and a linear battery, in which a ratio of a length to a cross-sectional diameter is very large, such as a cable-type battery, has been suggested in order to meet the requirement.

Specifically, the cable-type secondary battery is composed of an inner electrode having a predetermined-shaped horizontal cross section and extending in a longitudinal direction; an electrolyte layer formed on an outer surface of the inner electrode and serving as an ion path; an outer electrode formed by surrounding the inner electrode and the electrolyte layer; and a protective coating layer disposed around the outer electrode. Since the cable-type secondary battery has flexibility as well as a linear structure, the cable-type secondary battery may be freely deformed. Also, the cable-type secondary battery may have a high battery rate because the plurality of inner electrodes is included in a pipe-type outer electrode. Furthermore, since a capacity balance between the inner electrode and the outer electrode may be easily controlled by adjusting the number of inner electrodes and the electrolyte layer is formed in the inner electrode, a short between the electrodes may be prevented.

However, since an electrolyte in a liquid state is mainly used in the cable-type battery, the possibility of volatilization of an organic solvent may not only be high but combustion and electrolyte solution leakage due to the increases in ambient temperature and temperature of the battery itself may also occur. Thus, the stability of the battery may be poor. In a case where a polymer electrolyte is used as an electrolyte solution in order to improve the above limitations, the inflow of the electrolyte to an electrode active material may be difficult, and thus, resistance of the battery may increase and capacity characteristics and cycle characteristics may degrade.

Therefore, the development of a newly configured cable-type battery having an electrolyte injected thereinto, which may improve a battery performance by preventing the leakage of a typical electrolyte and forming a stable interface between the electrode and the electrolyte, is urgent.

DISCLOSURE OF THE INVENTION

Technical Problem

The present invention provides a freely deformable cable-type secondary battery having improved battery stability by preventing an electrolyte solution leakage by including a hollow core portion into which a gel polymer electrolyte is injected.

The present invention also provides a method of preparing the cable-type secondary battery.

Technical Solution

According to an aspect of the present invention, there is provided a cable-type secondary battery having a predetermined-shaped horizontal cross section and extending in a longitudinal direction including:

a hollow core portion having a gel polymer electrolyte injected thereinto;

an inner electrode which includes an open-structured inner current collector surrounding an outer surface of the hollow core portion and an inner electrode active material layer formed on a surface of the inner current collector;

a separation layer surrounding an outer surface of the inner electrode;

an outer electrode which includes an outer electrode active material layer surrounding an outer surface of the separation layer and an outer current collector surrounding an outer surface of the outer electrode active material layer; and a protective coating layer.

Advantageous Effects

According to the present invention, since a hollow core portion having a gel polymer electrolyte injected thereinto is included, an electrolyte leakage may not only be prevented but a stable interface between electrode and electrolyte may also be formed. Thus, a cable-type secondary battery having stability and high performance characteristics may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
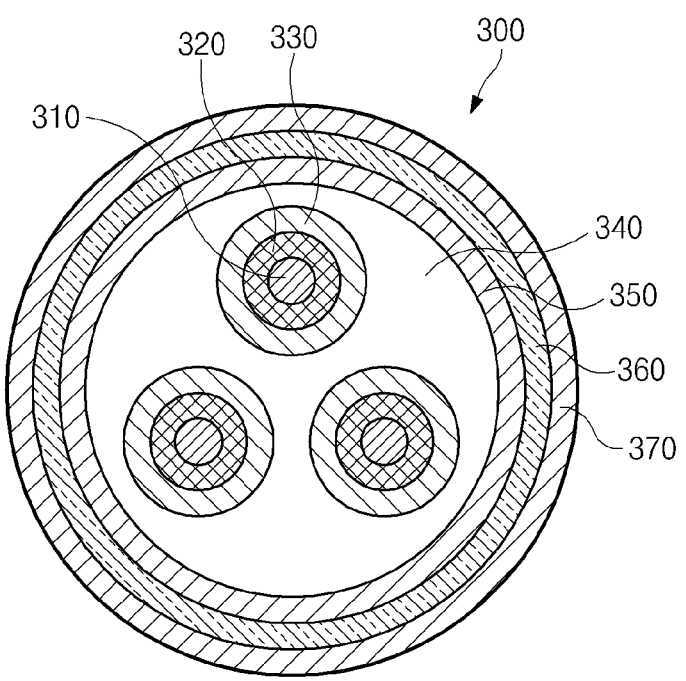
FIGS. 1 and 2 are cross-sectional views illustrating cable-type secondary batteries prepared according to embodiments of the present invention.

Specifically, according to an embodiment of the present invention, a gel polymer electrolyte injected into the hollow core portion may include an organic electrolyte solution including an ionic salt, and a cross-linked polymer.

In this case, the ionic salt included in the organic electrolyte solution may be one or more lithium salts selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, and lithium tetraphenyl borate.

Also, examples of the organic electrolyte solution may be one or more organic electrolyte solutions selected from the group consisting of ethylene carbonate (EC), propylene carbonate (PC), butylene carbonate (BC), vinylene carbonate (VC), diethyl carbonate (DEC), dimethyl carbonate (DMC), ethylmethyl carbonate (EMC), methyl formate (MF), gamma-butyrolactone (γ-BL), sulfolane, methyl acetate (MA), and methyl propionate (MP).

Furthermore, the cross-linked polymer may include a monomer having two or more functional groups, or a (co)polymer obtained by a polymerization reaction of a monomer having two or more functional groups and a polar monomer having one functional group in the presence of a thermal initiator.

In this case, the thermal initiator may include benzoyl peroxide or azobisisobutyronitrile (AIBN). The thermal initiator may be included in an amount of about 3 wt % or less and for example, may be included in an amount ranging from about 0.5 wt % to about 3 wt % based on a total weight of the above monomers.

Also, the monomer having two or more functional groups may include one or more monomers selected from the group consisting of trimethylolpropane ethoxylate triacrylate, polyethylene glycol dimethacrylate, polyethylene glycol diacrylate, divinylbenzene, polyester dimethacrylate, divinyl ether, trimethylolpropane, trimethylolpropane trimethacrylate, and ethoxylated bisphenol A dimethacrylate. Furthermore, the polar monomer having one functional group may include one or more monomers selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

The cross-linked polymer may be included in an amount ranging from about 2 wt % to about 5 wt % based on a total weight of the organic electrolyte solution. In the case that the amount of the cross-linked polymer is less than 2 wt %, since a gel-type electrolyte may not be formed, the electrolyte may not maintain its form and may flow. In the case in which the amount of the cross-linked polymer is greater than 5 wt %, ionic conductivity of the gel electrolyte may be decreased due to the large amount of the polymer.

With respect to a typical polymer electrolyte used in a cable-type secondary battery, since the reaction rate of lithium ions is very low even if the ionic conductivity is satisfied, the realization of a battery performance may be inhibited. Also, since the fluidity of the electrolyte itself may be insufficient, the electrolyte may be difficult to be introduced by being injected into the hollow core portion in the battery. In contrast, in a case where the gel polymer electrolyte of the present invention is used, the fluidity of a gel polymer electrolyte component before the cross-linking reaction is excellent. Thus, the introduction of the gel polymer electrolyte component may not only be possible by being injected into the hollow core portion in the battery to uniformly distribute the electrolyte on an inner electrode, a separation layer, and an outer electrode, but battery resistance may also be reduced and battery lifetime characteristics and rate characteristics may also be improved because lithium ions in the battery may easily move.

Also, according to an embodiment of the present invention, an inner current collector of the cable-type secondary battery is formed in an open structure in which a portion thereof is opened to facilitate the penetration of the electrolyte that is injected into the hollow core portion. Specifically, any current collector may be used as the inner current collector so long as it has an open structure, in which the opened portion acts as an interface, and a material may freely move from the inside to the outside through the interface. For example, the inner current collector may have one or more hybrid structures selected form the group consisting of a wound wire-type current collector and a mesh-type current collector.

In this case, the inner current collector may act to collect electrons generated by an electrochemical reaction of an active material or may act to supply electrons required for the electrochemical reaction, and a metal, such as aluminum or copper, may be generally used. However, in the present invention, the inner current collector may be formed of stainless steel, aluminum, nickel, titanium, fired carbon, or copper; stainless steel surface treated with carbon, nickel, titanium, or silver; an aluminum-cadmium alloy; a non-conductive polymer surface treated with a conducive agent; or a conductive polymer. However, the inner current collector is not limited thereto.

That is, in a case where a polymer conductor formed of the non-conductive polymer surface treated with a conductive agent or the conductive polymer is used as the inner current collector, a cable-type secondary battery having better flexibility may be prepared in comparison to the case of using the metal such as copper or aluminum. Also, a lightweight battery may be obtained in comparison to the metal current collector. In this case, polyacetylene, polyaniline, polypyrrole, polythiophene, polysulfur nitride, indium tin oxide (ITO), silver, palladium, and nickel may be used as the conductive agent. Furthermore, the conductive polymer used may be a compound or one or more polymers selected from the group consisting of polyacetylene, polyaniline, polypyrrole, polythiophene, and polysulfur nitride.

According to an embodiment of the present invention, the inner electrode of the cable-type secondary battery may be an anode or a cathode, and the outer electrode may be a cathode or an anode, which corresponds to the inner electrode. The electrode active material layer of the present invention may act to transfer ions through the current collector, and the movement of the ions may be performed by an interaction caused by the intercalation of ions to the electrolyte layer and the deintercalation of ions from the electrolyte layer.

Specifically, in a case where the inner electrode of the cable-type secondary battery is an anode, the inner active material layer may include one or more anode active material layers selected from the group consisting of natural graphite, artificial graphite, and a carbonaceous material; lithium-containing titanium composite oxides (LTO); metals (Me) such as silicon (Si), tin (Sn), lithium (Li), zinc (Zn), magnesium (Mg), cadmium (Cd), cerium (Ce), nickel (Ni), or iron (Fe); alloys formed of the metals (Me); oxides ($MeO_x$) of the metals (Me); and composites of the metals (Me) and carbon.

In the present invention, after preparing the inner current collector in the form of a linear wire, a surface of the inner current collector may be coated with the inner active material layer by electroplating, an anodic oxidation process, dip coating, or discontinuous extrusion coating of an electrode slurry including an active material by an extruder in order to maintain a predetermined spacing.

In this case, one or more wires are wound in a coil shape, or one or more wire composites, which are formed by twisting two or more wires in a spiral shape, are wound in a coil shape by using the prepared linear wire, and thus, the wound products thus obtained may be used as the inner electrode of the cable-type secondary battery.

Also, according to an embodiment of the present invention, a separator may be used as the separation layer. In a case where the separation layer is a separator, the separator may include a porous substrate prepared from a polyolefin-based polymer selected from the group consisting of an ethylene homopolymer, a propylene homopolymer, an ethylene-butene copolymer, an ethylene-hexene copolymer, and an ethylene-methacrylate copolymer; a porous substrate prepared from a polymer selected from the group consisting of polyester, polyacetal, polyamide, polycarbonate, polyimide, polyetheretherketone, polyethersulfone, polyphenylene oxide, polyphenylene sulfide, and polyethylene naphthalene; or a porous substrate formed of a mixture of inorganic particles and a binder polymer.

Furthermore, according to an embodiment of the present invention, the outer electrode of the cable-type secondary battery may be a cathode or an anode, which corresponds to the inner electrode.

In a case where the outer electrode of the cable-type secondary battery of the present invention is a cathode, the electrode active material layer may be formed of one or more cathode active material layers selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (where M1 and M2 are each independently any one selected from the group consisting of aluminum (Al), Ni, cobalt (Co), Fe, manganese (Mn), vanadium (V), chromium (Cr), titanium (Ti), tungsten (W), tantalum (Ta), Mg, and molybdenum (Mo), and x, y, and z are each independently an atomic fraction of each component in oxides, in which $0 \leq x < 0.5$, $0 \leq y < 0.5$, $0 \leq z < 0.5$, and $x+y+z=1$).

Also, according to an embodiment of the present invention, a pipe-type current collector, a wound wire-type current collector, a wound sheet-type current collector, or a mesh-type current collector may be used as the outer current collector. However, the outer current collector is not limited thereto.

The outer current collector may be formed of stainless steel, aluminum, nickel, titanium, fired carbon, or copper; stainless steel surface treated with carbon, nickel, titanium, or silver; an aluminum-cadmium alloy; a non-conductive polymer surface treated with a conducive agent; a conductive polymer; a metal paste including metal powder formed of Ni, Al, gold (Au), silver (Ag), palladium (Pd)/Ag, Cr, Ta, copper (Cu), barium (Ba), or ITO; or a carbon paste including carbon powder formed of graphite, carbon black, or carbon nanotubes.

Also, according to an embodiment of the present invention, the cable-type secondary battery may include an insulating protective coating layer on an outermost surface of the outer current collector in order to protect the electrode from moisture in air and external impact. A typical polymer resin including a moisture barrier layer may be used as the protective coating layer. For example, Al or a liquid crystal polymer having an excellent moisture barrier performance may be used as the moisture barrier layer, and polyethylene terephthalate (PET), polyvinyl chloride (PVC), high density polyethylene (HDPE), or an epoxy resin may be used as the polymer resin.

Furthermore, the cable-type secondary battery of the present invention may include an inner electrode composed of a plurality of electrodes or may include a plurality of inner electrodes having a separation layer formed on a surface thereof.

Specifically, the present invention provides a cable-type secondary battery 300 having a predetermined-shaped horizontal cross section and extending in a longitudinal direction including:

a hollow core portion 310 having a gel polymer electrolyte injected thereinto;

an inner electrode, in which two or more electrodes, which include an inner current collector 320 surrounding an outer surface of the hollow core portion 310 and an inner electrode active material layer 330 formed on a surface of the inner current collector 320, are disposed in parallel to each another;

a separation layer 340 surrounding outer surfaces of the two or more inner electrodes;

an outer electrode which includes an outer electrode active material layer 350 surrounding an outer surface of the separation layer 340 and an outer current collector 360 surrounding an outer surface of the outer electrode active material layer 350; and a protective coating layer 370 (see FIG. 1).

Figure 2:
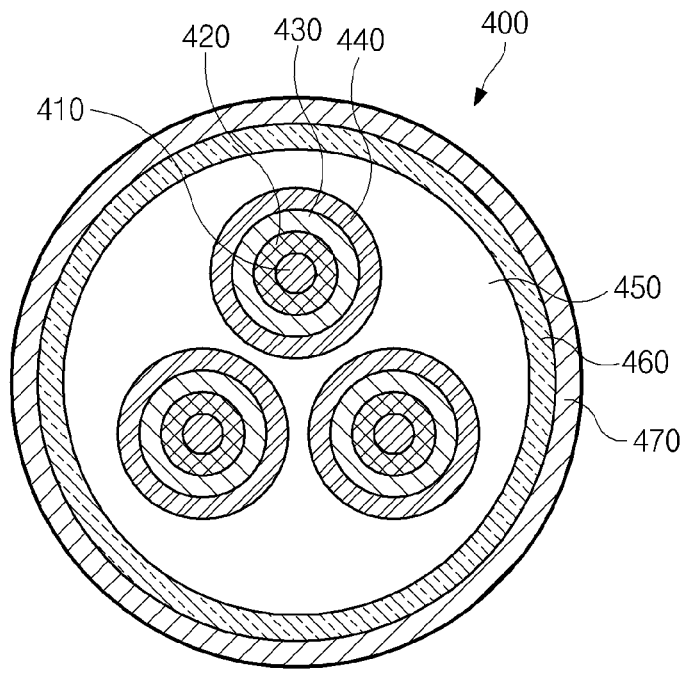

Also, another embodiment of the present invention provides a cable-type secondary battery 400 having a predetermined-shaped horizontal cross section and extending in a longitudinal direction including:

a hollow core portion 410 having a gel polymer electrolyte injected thereinto;

an inner electrode, in which two or more electrodes, which include an inner current collector 420 surrounding an outer surface of the hollow core portion 410, an inner electrode active material layer 430 formed on a surface of the inner current collector 420, and a separation layer 440 surrounding an outer surface of the inner electrode active material layer 430, are disposed in parallel to each another;

an outer electrode which includes an outer electrode active material layer 450 surrounding an outer surface of the separation layer 440 and an outer current collector 460 surrounding an outer surface of the outer electrode active material layer 450; and a protective coating layer 470 (see FIG. 2).

Since the cable-type secondary battery of the present invention may include the one or more inner electrodes, the balance between the anode and the cathode may be easily controlled. Also, since the cable-type secondary battery may include the plurality of electrodes, the possibility of a short circuit may be prevented.

Also, according to another embodiment of the present invention, a method of preparing a cable-type secondary battery includes: preparing an electrode assembly having a predetermined-shaped horizontal cross section and extending in a longitudinal direction, which includes an open-structured inner current collector including a hollow core portion, an inner electrode active material layer formed on a surface of the inner current collector, a separation layer formed on an outer surface of an inner electrode which includes the inner electrode active material layer and the inner current collector, and an outer electrode which includes an outer current collector and an outer electrode active material layer formed on an outer surface of the separation layer; and inserting the one or more electrode assemblies into a heat-shrinkable protective coating layer and then closely attaching the heat-shrunk protective coating layer to outer surfaces of the electrode assemblies by primarily heating around the heat-shrinkable protective coating layer, wherein the method further includes: preparing a gel polymer electrolyte solution before a cross-linking reaction that may form a gel polymer electrolyte core portion;

injecting the gel polymer electrolyte solution into the hollow core portion in the cable-type secondary battery after the closely attaching;

sealing an electrolyte inlet of the cable-type secondary battery into which the gel polymer electrolyte solution is injected; and forming a gel polymer electrolyte core portion through a thermal cross-linking reaction of a monomer in the electrolyte solution by secondarily heating the cable-type secondary battery in which the injected gel polymer electrolyte solution is included.

In the method of present invention, the primary heating may be performed in a temperature range of 80° C. to 130° C., in which the heat-shrinkable protective coating layer may be shrunk, and the secondary heating may be performed in a temperature range of 40° C. to 60° C. in order to proceed the thermal cross-linking reaction of the monomer that is included in the gel polymer electrolyte solution.

Also, the injecting of the gel polymer electrolyte solution may be performed by a method of inserting a needle into the hollow core portion in the cable-type battery and injecting.

Since a typical cable-type secondary battery may include an electrolyte layer between an inner electrode and an outer electrode and the electrolyte layer may separate the inner electrode and the outer electrode to prevent a short circuit, a gel-type polymer electrolyte having a predetermined level of mechanical properties or a solid polymer electrolyte needs to be used. However, since the gel-type polymer electrolyte or the solid polymer electrolyte has a low performance in supplying lithium ions, a thickness of the electrolyte layer may only be increased in order to sufficiently supply lithium ions to the electrode active material layer. As a result, resistance may increase as the distance between the electrodes is increased due to the increase in the thickness of the electrolyte layer, and thus, a battery performance may degrade.

Thus, as described above in the present invention, since a gel polymer electrolyte is included in the hollow core portion of the cable-type secondary battery, an electrolyte leakage may not only be prevented but lithium ions may also be uniformly supplied and exchanged from the gel polymer electrolyte through the inner electrode having the open structure in which the portion thereof is opened. Therefore, the performance of the battery may be further improved by forming a stable interface between the electrode and the electrolyte. Also, since the cable-type secondary battery of the present invention may include the inner electrode composed of the plurality of electrodes, the balance between the anode and the cathode may be easily controlled. Furthermore, since the cable-type secondary battery of the present invention may include the plurality of electrodes, the possibility of a short circuit may be prevented.

Hereinafter, the present invention will be described in detail, according to examples and comparative examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Example 1

97.5 g of an organic electrolyte solution (1M $LiPF_6$, EC:PC=1:1) and 2.5 g of trimethylolpropane ethoxylate triacrylate (TMPEOTA) were uniformly mixed, and 0.025 g of benzoyl peroxide as a thermal initiator was then added thereto. The mixture was cast on a glass plate and irradiated with ultraviolet light in an oven at 50° C. for 3 hours to prepare a gel polymer electrolyte including a cross-linked polymer.

Stainless steel was used as a working electrode and a lithium metal was used as a counter electrode. Then, a coin-type battery was prepared by injecting the gel polymer electrolyte between the electrodes.

Example 2

A coin-type battery was prepared in the same manner as in Example 1 except that Ni—Sn plated copper was used as a working electrode.

Comparative Example 1

A coin-type battery was prepared in the same manner as in Example 1 except that an electrolyte solution composed of only the organic electrolyte solution of Example 1 was injected, instead of the gel polymer electrolyte of Example 1.

Comparative Example 2

A coin-type battery was prepared in the same manner as in Comparative Example 1 except that Ni—Sn plated copper was used as a working electrode.

Experimental Example 1

Electrochemical Stability Experiment

Electrochemical stabilities of the coin-type batteries of Example 1 and Comparative Example 1 were measured. That is, the electrochemical stabilities were measured by linear sweep voltammetry (LSV) to 6 V at a scan rate of 5 mV/S. The results thereof are presented in FIG. 3.

Figure 3:
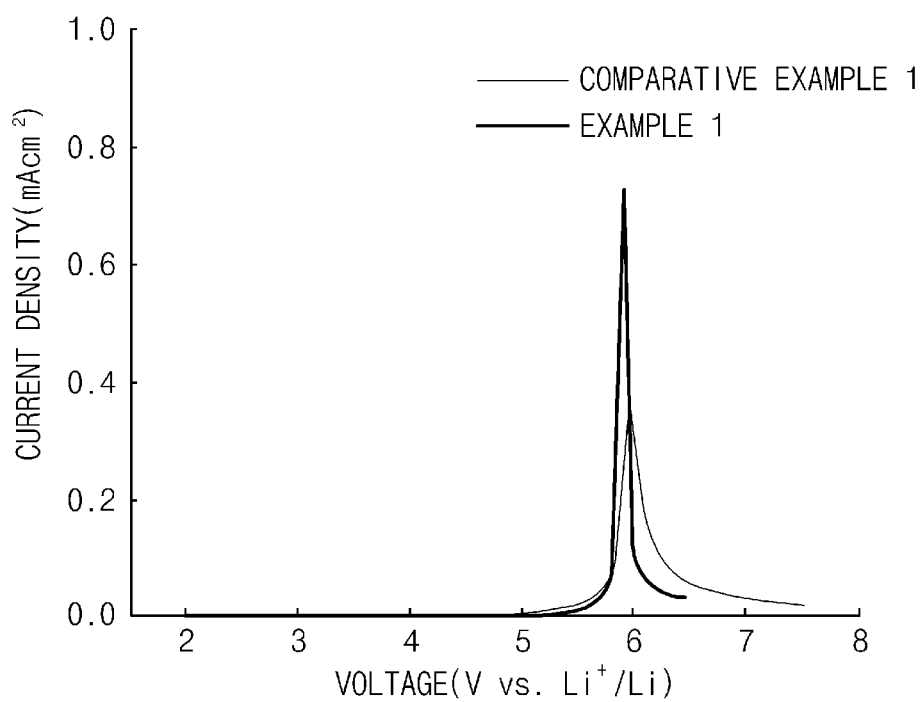
FIG. 3 is a graph illustrating the results of the measurement of electrochemical stability according to Experimental Example 1 of the present invention.

According to FIG. 3, it may be understood that the gel polymer electrolyte of Example 1 and the organic electrolyte solution of Comparative Example 1 exhibited similar characteristics and exhibited excellent electrochemical stabilities to 5 V.

Experimental Example 2

Electrochemical Stability Experiment

The half-cells of Example 2 and Comparative Example 2 were charged at a current density of 0.5 C to 5 mV under a constant current (CC) condition and the charge was then terminated when the current density reached 0.005 C while maintaining a constant voltage of 5 mV. The half-cells of Example 2 and Comparative Example 2 were discharged at a current density of 0.1 C to 1.5 V in a CC mode. The charge and discharge were performed under the same condition and normalized graphs are presented in FIGS. 4A and 4B.

Figure 4A:
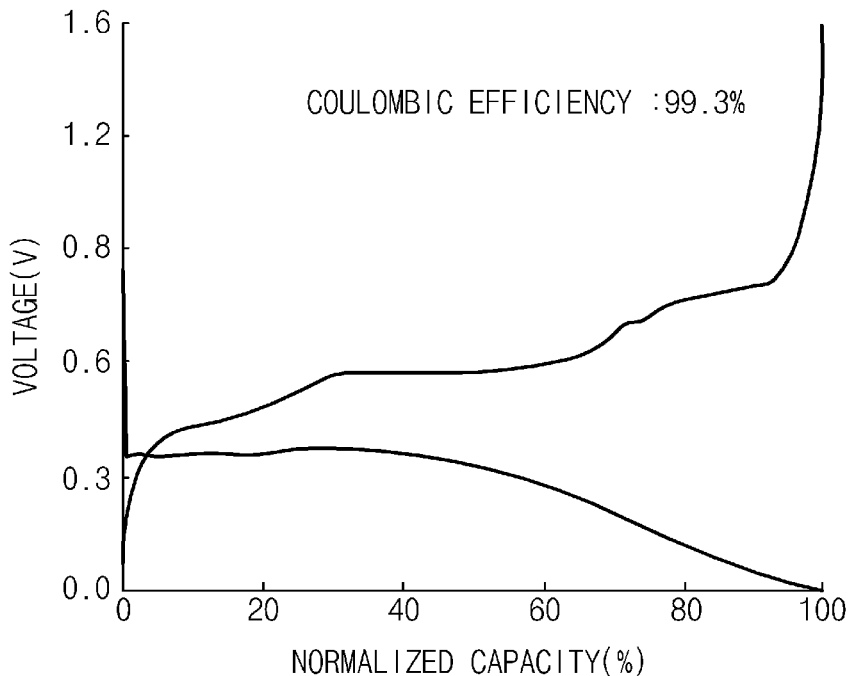
FIGS. 4A and 4B are graphs illustrating the results of the measurement of electrochemical stability according to Experimental Example 2 of the present invention.
Figure 4B:
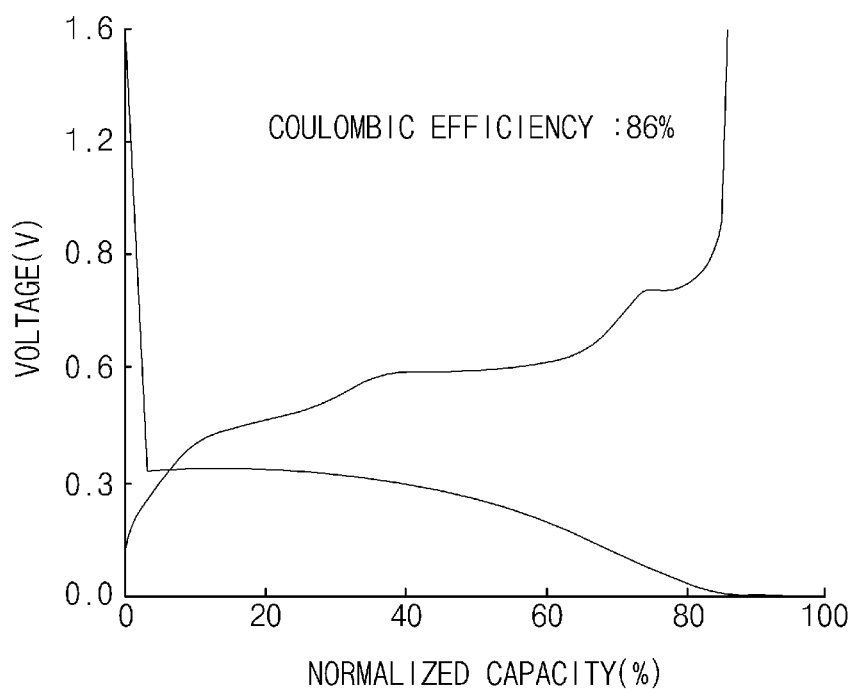

Referring to FIGS. 4A and 4B, it may be confirmed that the half-cell of Example 2 using the gel polymer electrolyte had more improved initial efficiency than the half-cell of Comparative Example 2. The reason for this may be considered that the initial efficiency was improved because the stability of the interface between the Ni—Sn electrode and the gel polymer electrolyte was improved.

SYMBOL OF EACH OF THE ELEMENTS IN THE FIGS

300, 400: cable-type secondary battery
310, 410: hollow core portion
320, 420: inner current collector
330, 430: inner electrode active material layer
340, 440: separation layer
350, 450: outer electrode active material layer
360, 460: outer current collector
370, 470: protective coating layer

The invention claimed is:

1. A cable-type secondary battery having a horizontal cross section and extending in a longitudinal direction, the cable-type secondary battery comprising:
    a core portion having a gel polymer electrolyte injected thereinto;
    an inner electrode which includes an open-structured inner current collector surrounding an outer surface of the core portion and an inner electrode active material layer, the inner current collector having an inner surface facing the core portion and an outer surface facing away from the core portion, wherein the inner electrode active material layer is only formed on the outer surface of the inner current collector;
    a separation layer surrounding an outer surface of the inner electrode;
    an outer electrode which includes an outer electrode active material layer surrounding an outer surface of the separation layer and an outer current collector surrounding an outer surface of the outer electrode active material layer; and
    a protective coating layer.

2. The cable-type secondary battery of claim 1, wherein the gel polymer electrolyte injected into the core portion comprises an organic electrolyte solution including an ionic salt, and a cross-linked polymer.

3. The cable-type secondary battery of claim 2, wherein the ionic salt comprises one or more lithium salts selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, and lithium tetraphenyl borate.

4. The cable-type secondary battery of claim 2, wherein the organic electrolyte solution comprises one or more organic electrolyte solutions selected from the group consisting of ethylene carbonate, propylene carbonate, butylene carbonate, vinylene carbonate, diethyl carbonate, dimethyl carbonate, ethylmethyl carbonate, methyl formate, gamma-butyrolactone, sulfolane, methyl acetate, and methyl propionate.

5. The cable-type secondary battery of claim 2, wherein the cross-linked polymer comprises a monomer having two or more functional groups, or a copolymer obtained by a polymerization reaction of a monomer having two or more functional groups and a polar monomer having one functional group in the presence of a thermal initiator.

6. The cable-type secondary battery of claim 5, wherein the thermal initiator comprises benzoyl peroxide or azobisisobutyronitrile (AIBN).

7. The cable-type secondary battery of claim 5, wherein the monomer having two or more functional groups comprises one or more monomers selected from the group consisting of trimethylolpropane ethoxylate triacrylate, polyethylene glycol dimethacrylate, polyethylene glycol diacrylate, divinylbenzene, polyester dimethacrylate, divinyl ether, trimethylolpropane, trimethylolpropane trimethacrylate, and ethoxylated bisphenol A dimethacrylate.

8. The cable-type secondary battery of claim 5, wherein the polar monomer having one functional group comprises one or more monomers selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

9. The cable-type secondary battery of claim 2, wherein the cross-linked polymer is included in an amount ranging from about 2 wt % to about 5 wt % based on a total weight of the organic electrolyte solution.

10. The cable-type secondary battery of claim 1, wherein the inner current collector has one or more hybrid structures selected form the group consisting of a wound wire-type current collector and a mesh-type current collector.

11. The cable-type secondary battery of claim 1, wherein the inner current collector is selected from the group consisting of stainless steel, aluminum, nickel, titanium, fired carbon, or copper; stainless steel surface treated with carbon, nickel, titanium, or silver; an aluminum-cadmium alloy; a non-conductive polymer surface treated with a conducive agent; or a conductive polymer.

12. The cable-type secondary battery of claim 1, wherein the inner electrode is an anode or a cathode, and the outer electrode is a cathode or an anode, which corresponds to the inner electrode.

13. The cable-type secondary battery of claim 12, wherein, in a case where the inner electrode is an anode, the inner active material layer comprises one or more anode active material layers selected from the group consisting of natural graphite, artificial graphite, and a carbonaceous material; lithium-containing titanium composite oxides (LTO); metals (Me) including silicon (Si), tin (Sn), lithium (Li), zinc (Zn), magnesium (Mg), cadmium (Cd), cerium (Ce), nickel (Ni), or iron (Fe); alloys formed of the metals (Me); oxides of the metals (Me); and composites of the metals (Me) and carbon.

14. The cable-type secondary battery of claim 1, wherein the separation layer is a separator.

15. The cable-type secondary battery of claim 14, wherein the separator comprises a porous substrate prepared from a polyolefin-based polymer selected from the group consisting of an ethylene homopolymer, a propylene homopolymer, an ethylene-butene copolymer, an ethylene-hexene copolymer, and an ethylene-methacrylate copolymer; a porous substrate prepared from a polymer selected from the group consisting of polyester, polyacetal, polyamide, polycarbonate, polyimide, polyetheretherketone, polyethersulfone, polyphenylene oxide, polyphenylene sulfide, and polyethylene naphthalene; or a porous substrate formed of a mixture of inorganic particles and a binder polymer.

16. The cable-type secondary battery of claim 1, wherein, in a case where the outer electrode is a cathode, the outer electrode active material layer comprises one or more cathode active material layers selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_z$ (where M1 and M2 are each independently any one selected from the group consisting of aluminum (Al), Ni, cobalt (Co), Fe, manganese (Mn), vanadium (V), chromium (Cr), titanium (Ti), tungsten (W), tantalum (Ta), Mg, and molybdenum (Mo), and x, y, and z are each independently an atomic fraction of each component in oxides, in which $0.1 \leq eq. x<0.5$, $0.1 \leq eq. y<0.5$, $0.1 \leq eq. z<0.5$, and $x+y+z=1$).

17. The cable-type secondary battery of claim 1, wherein the outer current collector is a pipe-type current collector, a wound wire-type current collector, a wound sheet-type current collector, or a mesh-type current collector.

18. The cable-type secondary battery of claim 1, wherein the outer current collector comprises stainless steel, aluminum, nickel, titanium, fired carbon, or copper; stainless steel surface treated with carbon, nickel, titanium, or silver; an aluminum-cadmium alloy; a non-conductive polymer surface treated with a conducive agent; a conductive polymer; a metal paste including metal powder formed of Ni, Al, gold (Au), silver (Ag), palladium (Pd)/Ag, Cr, Ta, copper (Cu), barium (Ba), or indium tin oxide (ITO); or a carbon paste including carbon powder formed of graphite, carbon black, or carbon nanotubes.

19. The cable-type secondary battery of claim 1, wherein the protective coating layer comprises a polymer resin including a moisture barrier layer.

20. A cable-type secondary battery having a horizontal cross section and extending in a longitudinal direction, the cable-type secondary battery comprising:
a core portion having a gel polymer electrolyte injected thereinto;
an inner electrode, in which two or more electrodes are disposed in parallel to each other, the two or more electrodes each including an inner current collector surrounding an outer surface of the core portion and an inner electrode active material layer, the inner current collector having an inner surface facing the core portion and an outer surface facing away from the core portion, wherein the inner electrode active material layer is only formed on the outer surface of the inner current collector;
a separation layer surrounding outer surfaces of the two or more inner electrodes;
an outer electrode which includes an outer electrode active material layer surrounding an outer surface of the separation layer and an outer current collector surrounding an outer surface of the outer electrode active material layer; and
a protective coating layer.

21. A cable-type secondary battery having a horizontal cross section and extending in a longitudinal direction, the cable-type secondary battery comprising:
a core portion having a gel polymer electrolyte injected thereinto;
an inner electrode, in which two or more electrodes, which include an inner current collector surrounding an outer surface of the core portion, an inner electrode active material layer formed on a surface of the inner current collector, and a separation layer surrounding an outer surface of the inner electrode active material layer, are disposed in parallel to each another;
an outer electrode which includes an outer electrode active material layer surrounding an outer surface of the separation layer and an outer current collector surrounding an outer surface of the outer electrode active material layer; and
a protective coating layer.

22. A method of preparing a cable-type secondary battery, the method comprising:
preparing an electrode assembly having a horizontal cross section and extending in a longitudinal direction, which includes an open-structured inner current collector including a core portion, an inner electrode active material layer formed on a surface of the inner current collector, a separation layer formed on an outer surface of an inner electrode which includes the inner electrode active material layer and the inner current collector, and an outer electrode which includes an outer current collector and an outer electrode active material layer formed on an outer surface of the separation layer; and
inserting the one or more electrode assemblies into a heat-shrinkable protective coating layer and then closely attaching the heat-shrunk protective coating layer to outer surfaces of the electrode assemblies by primarily heating around the heat-shrinkable protective coating layer,
wherein the method further comprises:
preparing a gel polymer electrolyte solution before a cross-linking reaction that forms a gel polymer electrolyte core portion;
injecting the gel polymer electrolyte solution into the core portion in the cable-type secondary battery after the closely attaching;
sealing an electrolyte inlet of the cable-type secondary battery into which the gel polymer electrolyte solution is injected; and
forming a gel polymer electrolyte core portion through a thermal cross-linking reaction of a monomer in the electrolyte solution by secondarily heating the cable-type secondary battery in which the injected gel polymer electrolyte solution is included.

* * * * *